US012685293B2

(12) United States Patent
    Campoy et al.

(10) Patent No.: US 12,685,293 B2
(45) Date of Patent: Jul. 21, 2026

(54) ANIMAL RECOVERY SUPPORT SYSTEM

(71) Applicant: Cornell University, Ithaca, NY (US)

(72) Inventors: Luis Campoy, Ithaca, NY (US); Andy Ruina, Ithaca, IN (US); Jason Cortell, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 18/852,221

(22) PCT Filed: Mar. 28, 2023

(86) PCT No.: PCT/US2023/016562
    § 371 (c)(1),
    (2) Date: Sep. 27, 2024

(87) PCT Pub. No.: WO2023/192277
    PCT Pub. Date: Oct. 5, 2023

(65) Prior Publication Data
    US 2025/0324940 A1      Oct. 23, 2025

Related U.S. Application Data

(60) Provisional application No. 63/324,905, filed on Mar. 29, 2022.

(51) Int. Cl.
    *A01K 1/06*          (2006.01)
(52) U.S. Cl.
    CPC .................................. *A01K 1/0613* (2013.01)
(58) Field of Classification Search
    CPC ............. A61D 3/00; A01K 15/04; A61H 1/00
    See application file for complete search history.

(56) References Cited

U.S. PATENT DOCUMENTS

| | | | |
|---|---|---|---|
| 4,981,136 A | 1/1991 | Chance | |
| 5,667,461 A * | 9/1997 | Hall .......................... | A61H 3/00 482/69 |
| 6,158,389 A | 12/2000 | Wehrell | |
| 10,265,565 B2 * | 4/2019 | Jue ........................... | A61H 1/02 |
| 2012/0037089 A1 | 2/2012 | Puhl | |
| 2013/0116604 A1 | 5/2013 | Morilla et al. | |
| 2014/0201906 A1 * | 7/2014 | Erturk ...................... | A61G 7/10 |
| 2015/0320632 A1 * | 11/2015 | Vallery ..................... | A61H 3/00 |
| 2016/0174528 A1 | 6/2016 | Dyson | |
| 2017/0232279 A1 * | 8/2017 | Strohman .............. | A62B 35/00 |
| 2018/0193217 A1 * | 7/2018 | Von Zitzewitz ......... | A61H 3/00 |
| 2020/0230005 A1 * | 7/2020 | Hidler ...................... | A61G 7/10 |

OTHER PUBLICATIONS

International Search Report and Written Opinion for Application PCT/US23/13026, dated Apr. 23, 2023, 13 pages.

* cited by examiner

*Primary Examiner* — Joshua J Michener
*Assistant Examiner* — Henry Hooper Mudd
(74) *Attorney, Agent, or Firm* — Barnes & Thornburg

(57) ABSTRACT

A land-based ungulate recovery support and stabilization system includes at least one fall control unit mounted in a recovery space and coupled to a harness via at least one rope. The at least one fall control unit provides means for applying brake force(s) to a land-based hoofed animal, such as a horse, fitted in the harness to manage motion of the animal. By managing motion, an uncontrolled fall, a stagger, and other jerking motions can be avoided to prevent injury.

17 Claims, 11 Drawing Sheets

18, 30

88

12

14

ANIMAL RECOVERY SUPPORT SYSTEM

PRIORITY CLAIM

This application is a U.S. national stage entry of PCT International Patent Application No. PCT/US2023/016562, filed Mar. 28, 2023, which claims priority to U.S. Provisional Application No. 63/324,905 filed 29 Mar. 2022, the disclosure of each of which is expressly incorporated by reference herein.

BACKGROUND

The present disclosure relates to animal recovery systems for land-based ungulates (hoofed animals). Equids, bovines, and other land-based ungulates recovering from a loss of stability, such as when recovering from anesthesia, may try to stand before their balance and muscular control has fully returned. As they do so, they can stumble or fall. In some cases, these falls can result in broken leg bones or other injuries. There is a need for systems and methods for supporting and stabilizing land-based ungulates during these recovery periods.

SUMMARY

According to the present disclosure, an ungulate recovery support system is described. The system includes a harness configured to be fitted on an animal and a fall control unit mounted in a recovery space that is coupled to the harness via a rope or web. The fall control unit is configured to apply a brake force to the harness through the rope to keep a fall velocity or acceleration of the harness within a preset limit when the harness is fitted to the animal during recovery. In this way, an uncontrolled fall and potential injury can be avoided.

In some embodiments, additional secondary fall control units may be included in the system. The secondary fall control units may be mounted in corners of the recovery space. The secondary fall control units can apply a brake force to the harness through secondary ropes or webs to keep a stagger velocity or acceleration of the harness within a preset limit. Thus, horizontal and/or other non-downward speed can be further controlled during recovery so that an uncontrolled stagger is avoided. Moreover, in some embodiments, the brake force can include an upward component when the secondary fall control units are mounted above the animal to supplement the brake force from the fall control unit.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
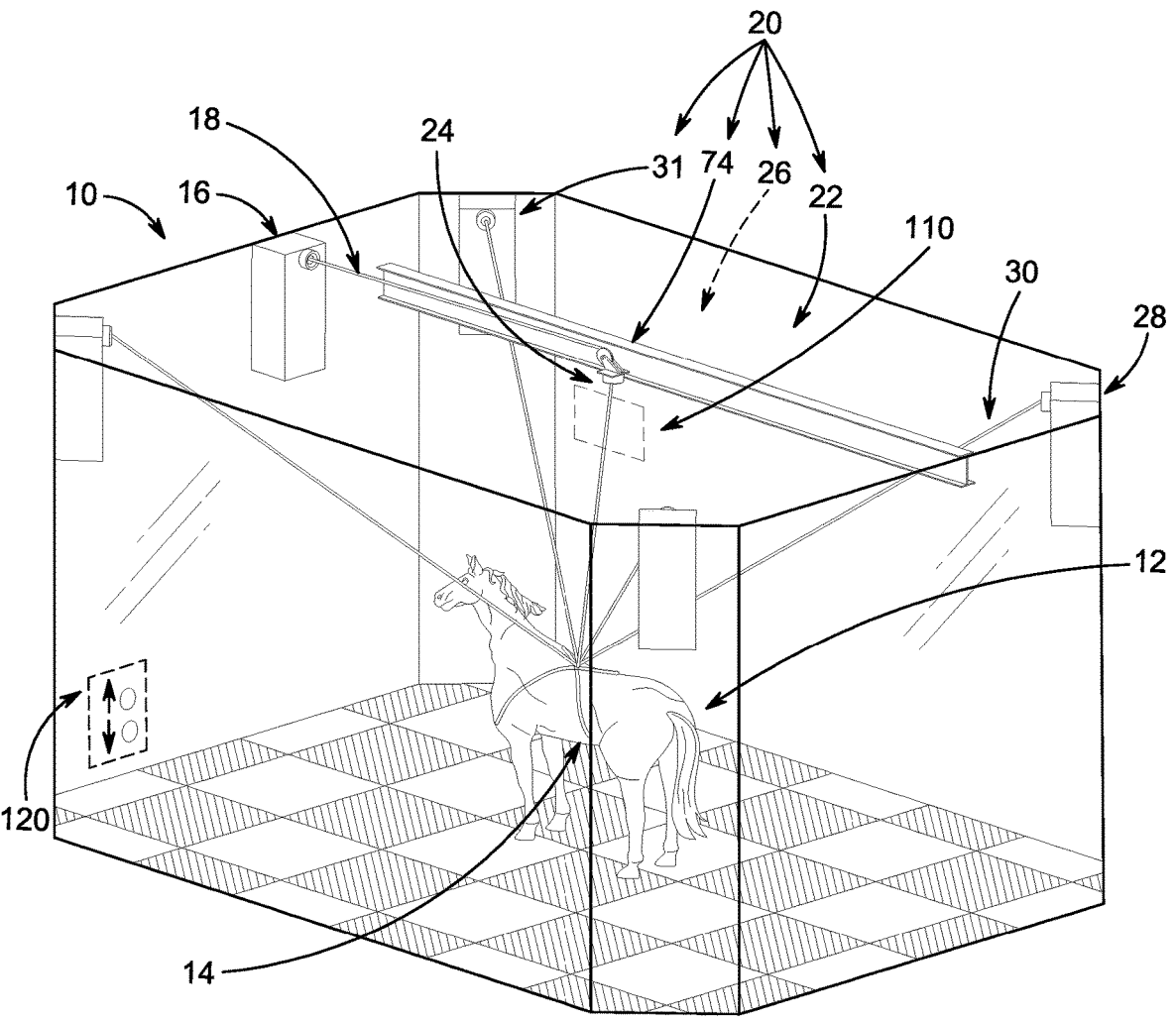
FIG. 1 is a perspective view of an exemplary land-based ungulate recovery support system including a recovery space with an overhead rail, a harness adapted to be fitted to an animal, and a number of fall control units mounted in the recovery space that are coupled to the harness via ropes.

A land-based ungulate recovery support system 10 is provided for use with hoofed animals 12, such as horses 12 as shown in FIG. 1. In one implementation, such a system 10 may include a harness 14 configured to be fitted on the land-based ungulate 12 and a fall control unit 16. The fall control unit 16 is configured to provide means for applying a brake force to the harness 14 through a rope 18 to keep a downward fall velocity or acceleration of the harness 14 within a preset limit during an animal recovery so that an uncontrolled fall (and potential injury) is avoided.

The fall control unit 16 is mounted along a wall 22 in a recovery space 20 and is coupled to the harness 14 via the rope 18 or web that extends over a ceiling mounted pulley 24 so that the brake force can be applied to resist downward motion of the animal 12 as shown in FIG. 1. In other embodiments, the fall control unit 16 may be mounted directly to a ceiling 26 of the recovery space 20.

The rope 18 used in the illustrative example may be made of VECTRAN material having properties conducive to quick stopping without undue stretch when sized for use in the disclosed system 10. Other suitable materials such as KEVLAR, steel cable, or the like sized for the application may also be used in the rope 18 for the disclosed system 10.

Optionally, the system 10 may include at least one secondary fall control units 28 mounted in the recovery space 20 and coupled to the harness 14 via secondary ropes 30 as shown in FIG. 1. The at least one secondary fall control units 28 provide means for applying a brake force to the harness 14 through the secondary ropes 30 to keep a horizontal velocity or acceleration of the harness 14 within a preset limit. In this way, horizontal speed of the animal 12 can be controlled so that an uncontrolled stagger (and potential injury) can be avoided. In the illustrated embodiment, each of the secondary fall control units 28 is arranged in an upper corner 31 of the recovery space 20. In other embodiments, the secondary fall control units 28 may be placed in other locations.

Figure 2:
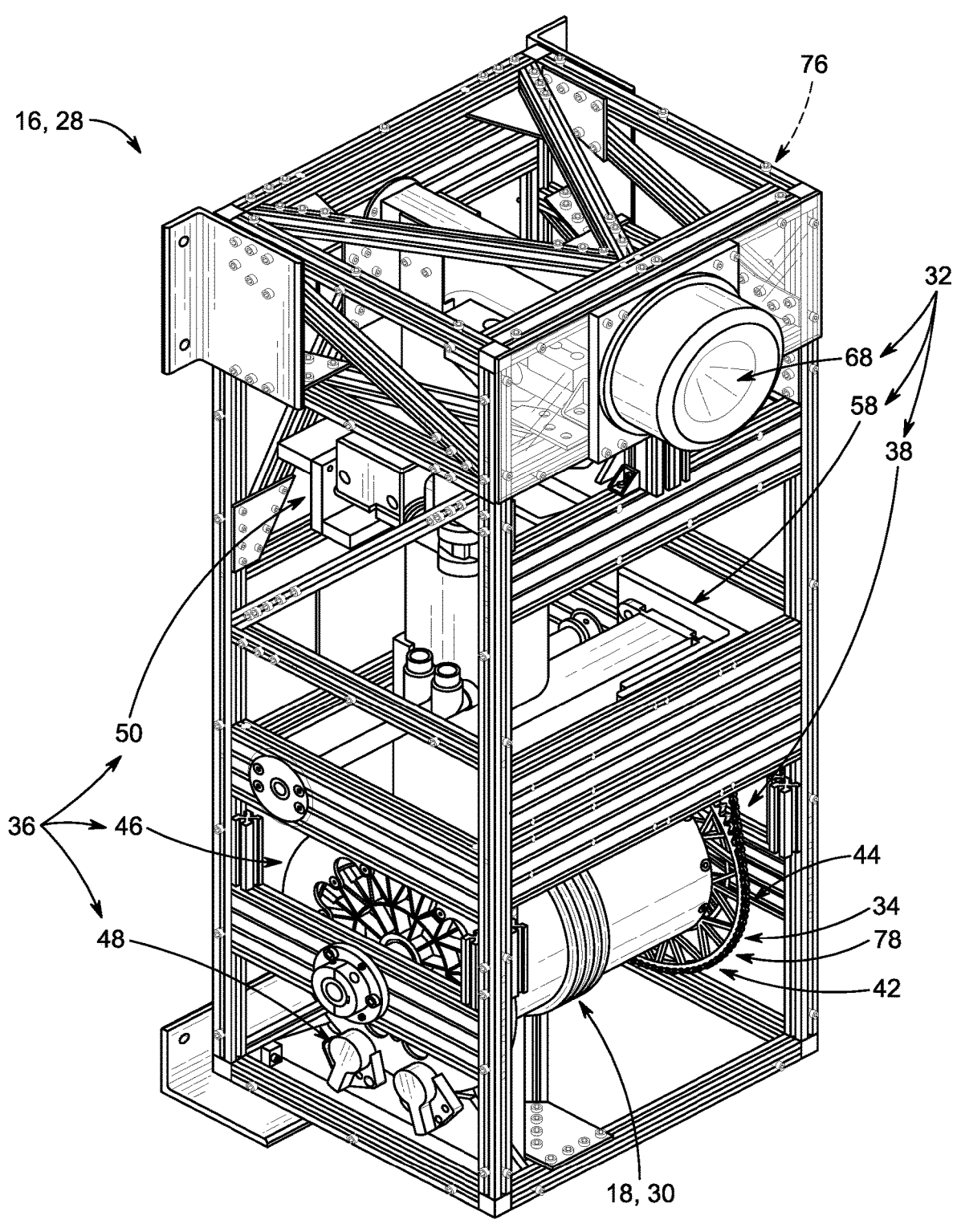
FIG. 2 is a perspective view of one of the fall control units with a housing broken away to show that the fall control unit includes a rope management assembly with a drum and a omnidirectional rope guide sleeve and a brake system with a brake caliper.

The fall control unit 16 may include a rope management assembly 32, a motor 34, and a brake system 36 as shown in FIG. 2. The rope management assembly 32 may have a drum 38 mounted for rotation about a drum axis 40 about which the rope 18 is wound. The motor 34 may be coupled to the drum 38 to drive rotation of the drum 38 to wind the rope 18 around the drum 38. The brake system 36 may be configured to selectively arrest rotation of the drum 38.

The fall control unit 16 may include a sensor 42 integrated with the motor 34 as shown in FIG. 2. A position sensor 78 is configured to detect positional information about the drum 38 that is extrapolated to provide a parameter associated with the downward fall velocity or acceleration of the harness 14. The fall control unit 16 may further include a controller 44 coupled to the sensor 42 and the brake system 36. The controller 44 may be configured to direct the brake system 36 to arrest rotation of the drum 38 in response to receipt of the parameter associated with the downward fall velocity or acceleration of the harness 14 that exceeds the preset limit.

Figure 5:
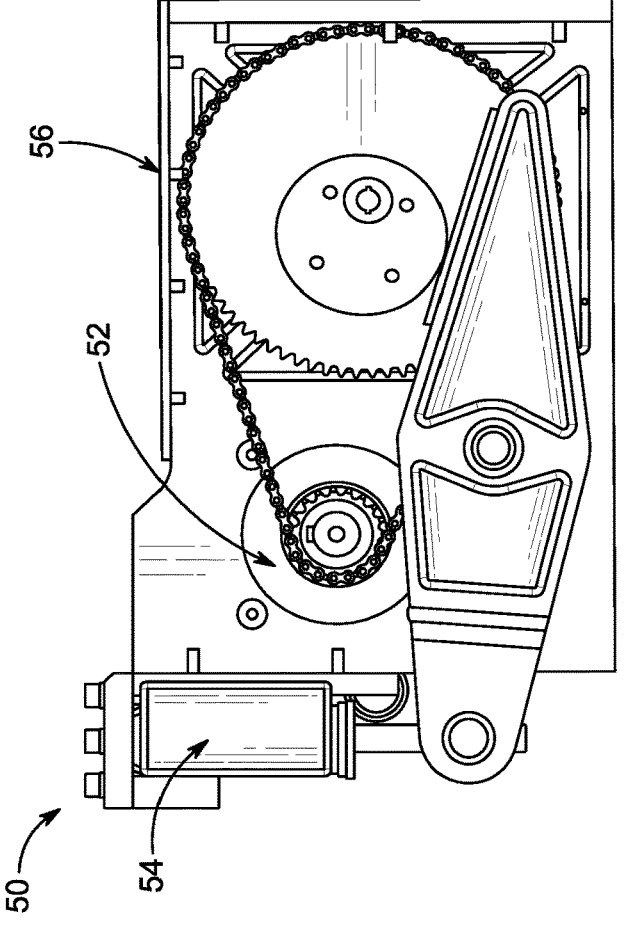
FIG. 5 is a view of a brake control of the brake system adapted for use with the fall control unit of FIG. 2.
Figure 4:
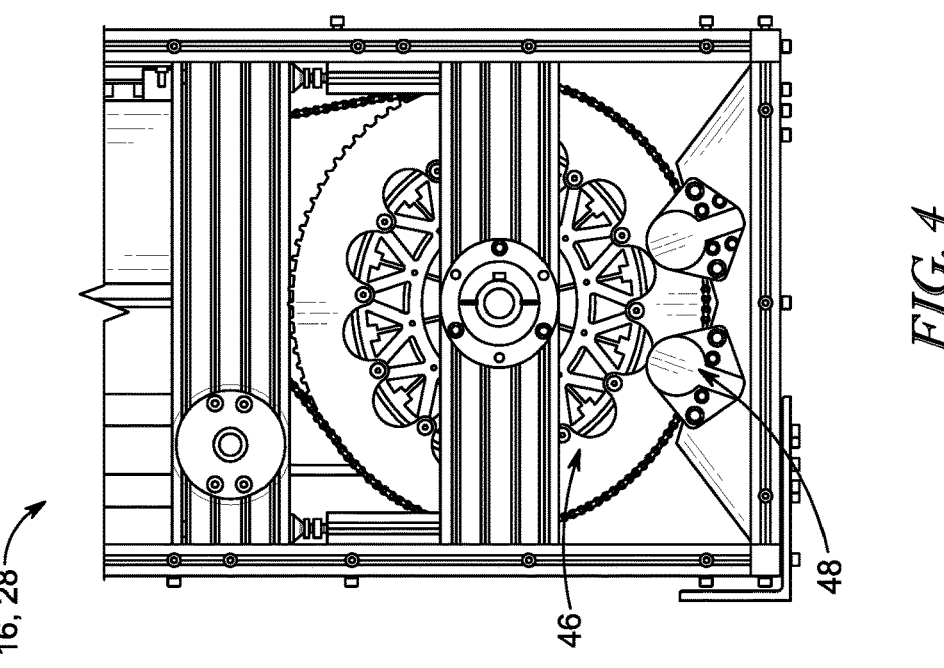
FIG. 4 is a side elevation view of a portion of the fall control unit of FIG. 2 showing a brake disk and the brake caliper incorporated into the fall control unit.

The brake system 36 illustratively includes a brake disk 46, a brake caliper 48, and a brake control 50 as shown in FIGS. 4 and 5. The brake disk 46 is coupled to the drum 38 of the rope management assembly 32 for rotation with the drum 38. The brake caliper 48 is configured to engage the brake disk 46 to arrest rotation of brake disk 46 and the drum 38 thereby creating the brake force on the rope 18. The brake control 50 selectively drives the brake caliper 48 to engage the brake disk 46.

The brake control 50 includes a secondary motor 52, a hydraulic brake master cylinder 54, and a linkage 56 as shown in FIG. 5. The secondary motor 52 is configured to output rotation upon direction from the controller 44 in response to excess fall velocity. Output rotation of the secondary motor 52 drives linear activation of the hydraulic brake master cylinder 54 via the linkage 56. When the hydraulic brake master cylinder 54 is activated, the brake caliper 48 squeezes/engages the brake disk 46 thereby stopping rotation of the drum 38 and preventing a fall and/or a stumble of the animal 12 in the harness 14.

Figure 6:
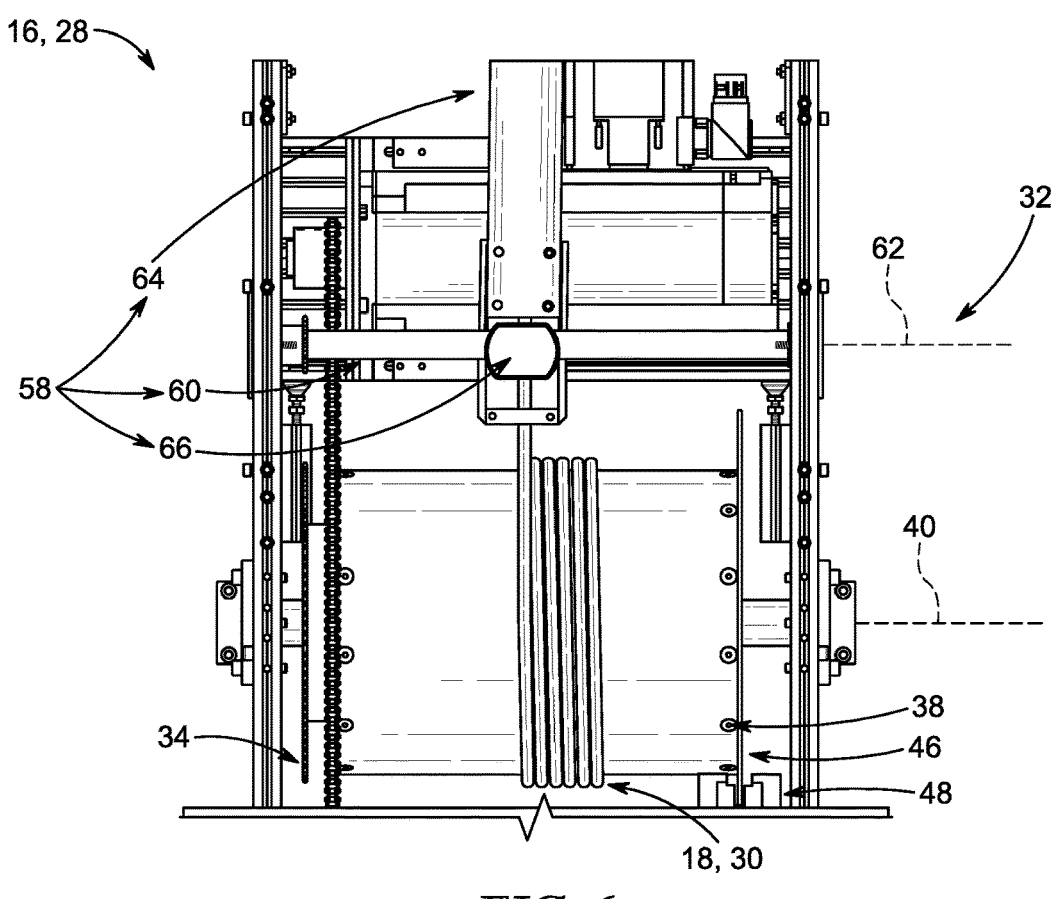
FIG. 6 is a front elevation view of a portion of the fall control unit of FIG. 2, showing a rope winder for managing the rope as it is wound onto the drum.

The rope management assembly 32 may include a rope winder 58 configured to direct the rope 18 during winding into a single layer along the drum 38 as shown in FIG. 6. The single layer of rope 18 can minimize give in the rope 18 that might be developed from multiple layers of rope 18 sliding relative to one another during a fall event. The rope winder 58 illustratively includes a threaded rod 60 mounted for rotation about a rod axis 62 parallel to and spaced apart from the drum axis 40, a line guide 64 through which the rope 18 is directed prior to contact with the drum 38 during winding, and a drive nut 66 fixed to the line guide 64 and engaged with threads of the threaded rod 60 so as to be moved with the line guide 64 along the rod axis 62 during rotation of the threaded rod 60. The motor 34 is coupled to the threaded rod 60 to drive rotation of the threaded rod 60 about the rod axis 62.

Figure 7:
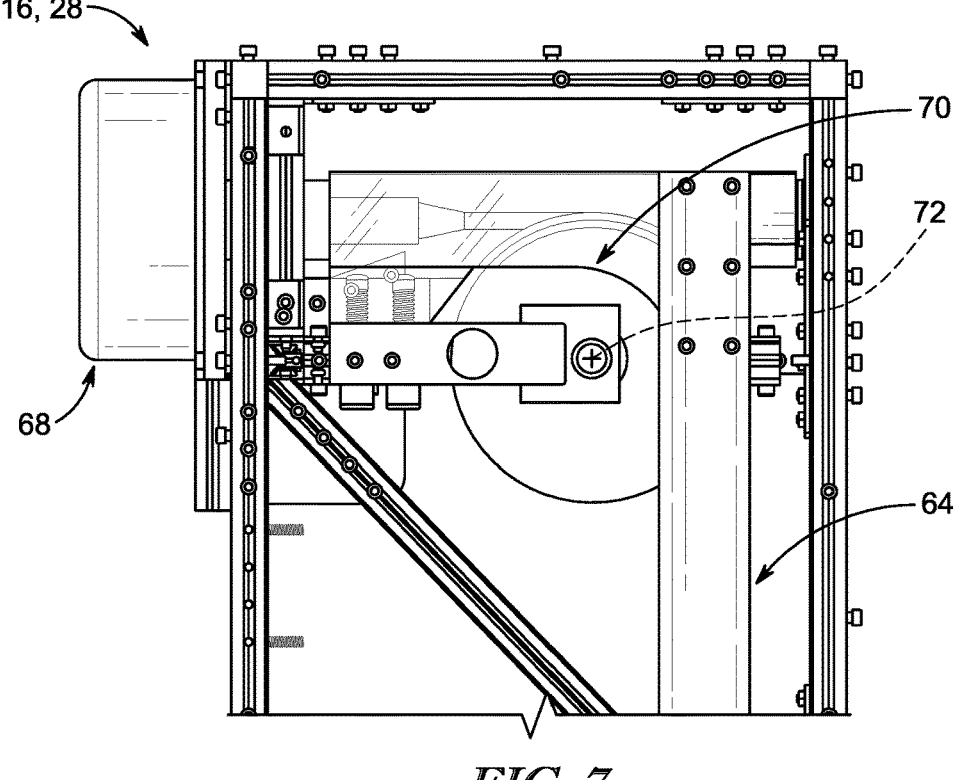
FIG. 7 is a side elevation view of a portion of the fall control unit of FIG. 2, showing the omnidirectional rope guide sleeve and a pulley included in the fall control unit.

The rope management assembly 32 may include the drum 38, an omnidirectional rope guide sleeve 68 through which the rope 18 passes as it exits the fall control unit 16, and a pulley 70 as shown in FIGS. 2 and 7. The rope 18 is wound about the drum 38 within the fall control unit 16. The rope 18 extends over the pulley 70 as it moves from the omnidirectional rope guide sleeve 68 to the drum 38. The pulley 70 is mounted to rotate about a pulley axis 72 and the pulley axis 72 can tilt so as to provide a tilting pulley 70.

A method of supporting a land-based ungulate 12 during recovery using the described system 10 is also provided. The method may include fitting the harness 14 onto the land-based ungulate 12, and performing at least one recovery step while the harness 14 is fitted onto the land-based ungulate 12. The harness 14 may keep the downward fall velocity or acceleration of the land-based ungulate 12 within the preset limit during the at least one recovery step.

The at least one recovery step can be or include recovering from anesthesia. In other embodiments, the system 10 may be used with other recovery steps such as gait training, weight loss therapies, and/or leg or foot rehabilitation, for example.

Horses 12 and other hoofed animals 12 recovering from anesthesia may try to stand before their balance and muscular control has fully returned. As the animal 12 does so, the animal 12 frequently stumbles or falls. In some cases, these falls can result in broken leg bones or other injuries, from which the animal 12 cannot readily recover. The system 10 disclosed provides support for the animal 12 as it attempts to stand, using the harness 14 around the chest of the animal 12 and one or more ropes 18, 30. The system 10 can also provide support during other kinds of recovery when stability of the hoofed animal 12 is compromised or may become compromised. The ropes 18, 30 are controlled by motors 34 and the brake systems 36 in such a way that the animal 12 can stand up freely, but can only fall slowly.

Systems 10 in accordance with the present disclosure are configured such that resistance from the motor 34 and the brake force are sufficient to arrest the falling and/or staggering motion of the animal 12 during recovery. Motors 34 and other components of these systems 10 are not sized to lift the animal 12 so as to manage size and cost of the system 10 while still providing adequate support for the recovering animal 12. However, it is contemplated that the fall control unit 16 and/or secondary fall control units 28 could be configured to lift the recovering animal 12 in part or in full. Moreover, systems 10 in line with the present disclosure could be implemented as a supplement to traditional hoist systems 110 or controls 120 as shown in FIG. 1.

The ungulate recovery support system 10 includes the harness 14, the fall control unit 16, and the rope 18 as shown in FIG. 1. The ungulate recovery support system 10 is located within the recovery space 20. The harness 14 is fit to the animal 12, such as on the chest area of the animal 12. The fall control unit 16 is mounted in the recovery space 20, such as on the wall 22 of the recovery space 20. The rope 18 interconnects the harness 14 and the fall control unit 16.

The rope 18 is coupled to and extends between the fall control unit 16 and the harness 14 as shown in FIG. 1. The rope 18 exits the fall control unit 16, extends over the ceiling mounted pulley 24, and attaches to the harness 14. The ceiling mounted pulley 24 may be mounted in an overhead location within the recovery space 20, such as on the ceiling 26 or on the overhead rail 74 coupled to the ceiling 26. The positioning of the ceiling mounted pulley 24 in the overhead location above the animal 12, as opposed to on a side of the animal 12, enables the fall control unit 16 to prevent downward falls of the animal 12.

The fall control unit 16 is mounted in the recovery space 20 and coupled to the harness 14 via the rope 18 as shown in FIG. 1. The fall control unit 16 is configured to apply the brake force to the harness 14 through the rope 18 to keep the downward fall velocity or acceleration of the harness 14 within a preset limit during recovery of the animal 12. The downward fall velocity or acceleration of the harness 14 being greater than or equal to the preset limit indicates that the animal 12 may be falling or that the animal 12 may be moving in a vertical and/or downward direction (i.e., a fall event). If the downward fall velocity or acceleration of the harness 14 is greater than or equal to the preset limit, the brake force is applied to stop the fall, and thus stop the vertical and downward motion of the animal 12. The brake force applied to the harness 14 maintains an upright position of the animal 12 within the recovery space 20 so as to prevent uncontrolled falls of the animal 12 and potential injury to the animal 12.

The fall control unit 16 includes a housing 76, the rope management assembly 32, the motor 34, and the brake system 36 as shown in FIGS. 1 and 2. The housing 76 contains the components of the fall control unit 16 therein. The rope management assembly 32 controls the movement and the tension of the rope 18. The motor 34 drives rotation of the rope management assembly 32 to control winding and unwinding of the rope 18, and thus, the tension of the rope 18. The brake system 36 is configured to selectively arrest rotation of the rope management assembly 32 so as to prevent unwinding of the rope 18 and apply the brake force to the harness 14.

The rope management assembly 32 includes the drum 38, the rope winder 58, the omnidirectional rope guide sleeve 68, and the pulley 70 as shown in FIGS. 2 and 7. The drum 38 is mounted for rotation within the fall control unit 16 about the drum axis 40. The rope winder 58 is configured to direct the rope 18 onto the drum 38. The omnidirectional rope guide sleeve 68 allows the rope 18 to pass through the fall control unit 16 and connect to the harness 14, which is external to the fall control unit 16. The pulley 70 is located within the housing 76 of the fall control unit 16 and is mounted for rotation about the pulley axis 72.

Figure 3:
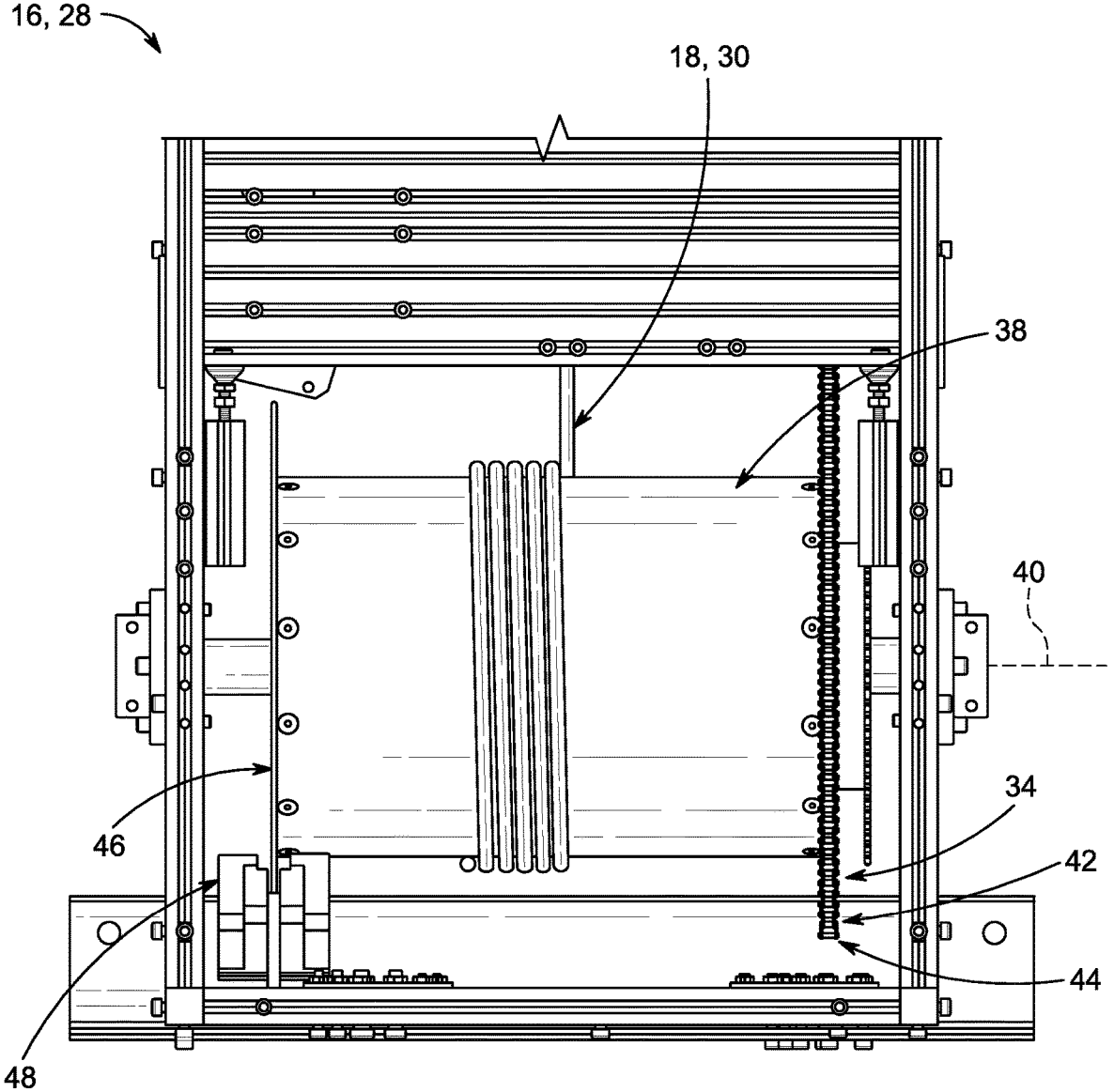
FIG. 3 is a front elevation view of a portion of the fall control unit of FIG. 2, showing the drum of the rope management assembly and a motor.

The drum 38 rotates about the drum axis 40 so that the rope 18 winds around the drum 38 as shown in FIG. 3. The drum 38 is coupled to the motor 34, and the motor 34 drives rotation of the drum 38. The winding and unwinding of the rope 18 around the drum 38 maintains the tension of the rope 18.

The rope winder 58 directs the rope 18 onto the drum 38 as the drum 38 rotates about the drum axis 40 as suggested in FIG. 6. The rope winder 58 directs the rope 18 onto the drum 38 in a single layer, as shown in FIG. 3, to minimize give in the rope 18 that might be developed from multiple layers of rope 18 sliding relative to one another during a fall event.

The rope winder 58 includes the threaded rod 60, the line guide 64, and the drive nut 66 as shown in FIG. 6. The threaded rod 60 is mounted on the fall control unit 16 for rotation about the rod axis 62. The rod axis 62 is parallel to and spaced apart from the drum axis 40. The line guide 64 extends from the omnidirectional rope guide sleeve 68 to the threaded rod 60 and directs the rope 18 through the fall control unit 16 to the drum 38. The drive nut 66 is mounted on the line guide 64.

The line guide 64 guides the rope 18 evenly into a single layer onto the drum 38 as the drum 38 rotates about the drum axis 40 as shown in FIG. 6. The drive nut 66 engages with threads of the threaded rod 60 so as to be moved with the line guide 64 along the rod axis 62 during rotation of the threaded rod 60.

The omnidirectional rope guide sleeve 68 is coupled to the housing 76 of the fall control unit 16 as shown in FIGS. 2 and 7. The omnidirectional rope guide sleeve 68 allows the rope 18 to extend external to the fall control unit 16 in any direction, which allows the animal 12 to be positioned in different locations within the recovery space 20. The omnidirectional rope guide sleeve 68 enables the fall control unit 16 to handle a full range of rope angles based on the location of the animal 12 within the recovery space 20.

The pulley 70 of the rope management assembly 32 directs the rope 18 from the omnidirectional rope guide sleeve 68 to and down the line guide 64 as shown in FIG. 7. The rope 18 extends over the pulley 70 as the rope 18 passes into the fall control unit 16 via the omnidirectional rope guide sleeve 68, through the line guide 64, and ultimately to the drum 38. The pulley 70 is mounted within the fall control unit 16 to rotate about the pulley axis 72 to move the rope 18. The pulley axis 72 may tilt so as to provide a tilting pulley 70.

The motor 34 of the fall control unit 16 is coupled to the drum 38, as shown in FIG. 3, and coupled to the threaded rod 60, as shown in FIG. 6, to drive the drum 38 and the threaded rod 60 about the drum axis 40 and the rod axis 62, respectively. Driving of both the drum 38 and the threaded rod 60 via the motor 34 winds the rope 18 around the drum 38. During normal operation (i.e., not during a fall event), the motor 34 maintains light tension in the rope 18.

The brake system 36 of the fall control unit 16 includes the brake disk 46, the brake caliper 48, and the brake control 50 as shown in FIGS. 2, 4, and 5. The brake system 36 selectively arrests rotation of the drum 38 to ensure the rope 18 does not unwind from the drum 38 during a fall event. The brake disk 46 and the brake caliper 48 are coupled to the drum 38. The brake control 50 controls the brake disk 46 and the brake caliper 48, and therefore, controls the brake force on the harness 14.

The brake disk 46 is coupled to the drum 38 of the rope management assembly 32 for rotation therewith about the drum axis 40 as shown in FIG. 3. During normal operation of the system 10, the brake disk 46 rotates with the drum 38.

The brake caliper 48 engages the brake disk 46 to selectively arrest rotation of the drum 38 to create the brake force on the harness 14 via the rope 18 as suggested in FIGS. 3 and 4. During a fall event, the brake caliper 48 compresses the brake disk 46 to create friction and stop rotation of the brake disk 46. Because the brake disk 46 is coupled to and rotates with the drum 38, the halting of rotation of the brake disk 46 via the brake caliper 48 stops rotation of the drum 38 as well. As the drum 38 is prevented from further rotation, the rope 18 cannot unwind from the drum 38, which inhibits movement of the animal 12 as no additional rope 18 may extend from the fall control unit 16 to allow for the movement.

The brake control 50 includes the secondary motor 52, the hydraulic brake master cylinder 54, and the linkage 56 as shown in FIG. 5. The brake control 50 selectively drives the brake caliper 48 to engage the brake disk 46, thereby creating the brake force on the harness 14.

The secondary motor 52 is coupled to the hydraulic brake master cylinder 54 via the linkage 56 as shown in FIG. 5. The secondary motor 52 rotates, which causes the linkage 56 to activate the hydraulic brake master cylinder 54. The secondary motor 52 drives linear activation of the hydraulic brake master cylinder 54. The brake control 50, including the secondary motor 52 and the hydraulic brake master cylinder 54, actuates the brake caliper 48 to create the brake force on the harness 14.

The hydraulic brake master cylinder 54 is activated via the secondary motor 52 and the linkage 56 as suggested in FIG. 5. The linkage 56 converts rotation of the secondary motor 52 into liner activation of the hydraulic brake master cylinder 54. Activation of the hydraulic brake master cylinder 54 creates hydraulic pressure in the brake caliper 48, which forces the brake caliper 48 to engage the brake disk 46. The contact between the brake caliper 48 and the brake disk 46 stops the drum 38 from rotating about the drum axis 40. Because the drum 38 is stopped from further rotation, the harness 14 experiences the brake force which prevents a fall of the animal 12.

The fall control unit 16 further includes the sensor 42 and the controller 44 as shown in FIG. 2. The sensor 42 is configured to detect a parameter associated with the fall velocity or acceleration of the harness 14. The controller 44 is coupled to the sensor 42 and the brake system 36.

The sensor 42 detects when a fall event is occurring based on the parameter, which corresponds to a velocity of the harness 14 or an acceleration of the harness 14 during a fall. Thus, if the detected parameter is greater than or equal to the preset limit, meaning a fall event has been detected, the sensor 42 communicates the parameter to the controller 44 by sending a signal. During normal operation, the parameter is less than the preset limit, meaning a fall event has not been detected by the sensor 42.

In alternative embodiments, the sensor 42 may be located on the harness 14, on the rope 18, 30, within the brake system 36, within the rope management assembly 32, or in any other suitable location within the system 10.

The sensor 42 includes a position sensor 78 as shown in FIG. 2. The position sensor 78 is configured to detect a position of the drum 38 that can be extrapolated to determine the parameter associated with the fall velocity or the acceleration of the harness 14. In alternative embodiments, the sensor 42 can include a motion sensor, a proximity sensor, a force sensor, a contact sensor, an encoder sensor, and/or an inertia measuring unit, among other types of sensors. Suitable combinations of sensors may also be employed.

The controller 44 receives the signal from the sensor 42 regarding the parameter indicating that a fall event is occurring. The controller 44 controls the brake force by directing the brake system 36 to arrest rotation of the drum 38. Thus, if a fall event is occurring such that the sensor 42 detects the parameter, the parameter is sent to the controller 44 via the signal. The controller 44 directs the secondary motor 52 to rotate, which activates the hydraulic brake master cylinder 54 via the linkage 56. The activation of the hydraulic brake master cylinder 54 causes the brake caliper 48 to squeeze the brake disk 46, thus stopping rotation of the brake disk 46. Because the brake disk 46 is coupled to and rotates with the drum 38, the halting of rotation of the brake disk 46 also stops rotation of the drum 38. As the drum 38 is prevented from further rotation, the rope 18 wound around the drum 38 cannot unwind, so the rope 18 cannot be extended an additional amount from the fall control unit 16. Because the rope 18 cannot be extended more, the animal 12 is prevented from vertical movement as vertical movement would require additional rope 18 extension. The brake force is applied to the harness 14 via the rope 18 and prevents the animal 12 from falling as falling would require the rope 18 to extend.

The fall control unit 16 can be fitted with an encoder sensor to record a force, position, speed, velocity, and/or acceleration of the rope 18, 30 and/or the drum 38. In this embodiment, the sensor 42 includes the encoder sensor. The encoder sensor converts motion of the rope 18, 30 and/or the drum 38 into an electrical signal that is recorded and transmitted to the controller 44. When the encoder sensor senses a force, position, speed, velocity, and/or acceleration of the rope 18, 30 and/or the drum 38 that is greater than the preset limit, the encoder sensor has detected a fall of the animal 12, and therefore, the fall control unit 16 will apply the brake force.

Figure 8:
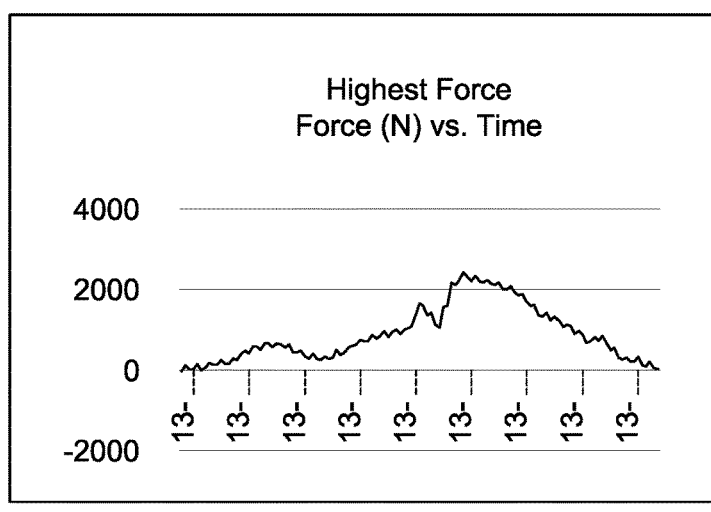
FIG. 8 is a graph showing data regarding the maximal recorded force of the rope and/or the drum over a time period which is used to detect a fall of the animal.
Figure 9:
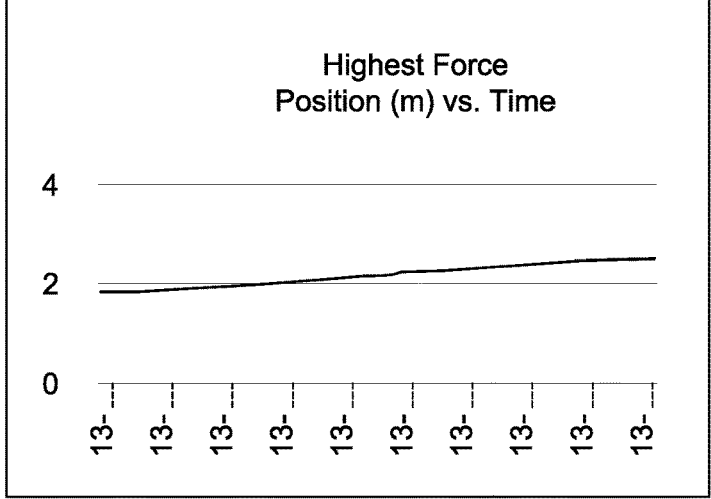
FIG. 9 is a graph showing data regarding the recorded position of the rope and/or the drum over a time period which is used to detect a fall of the animal.
Figure 10:
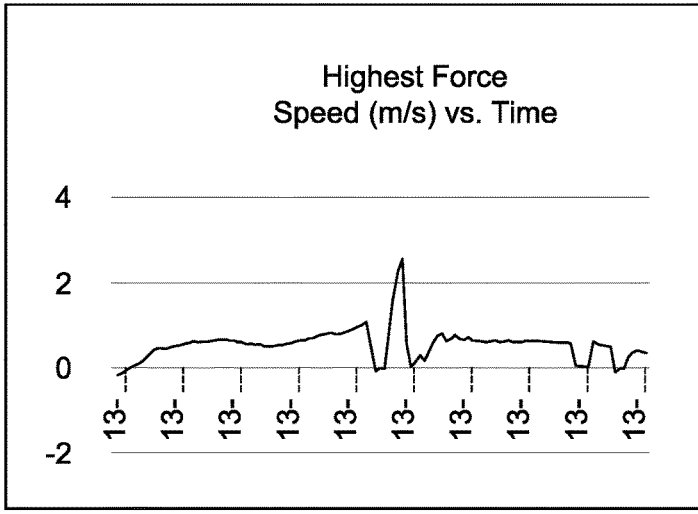
FIG. 10 is a graph showing data regarding the recorded speed of the rope and/or the drum over a time period which is used to detect a fall of the animal.
Figure 11:
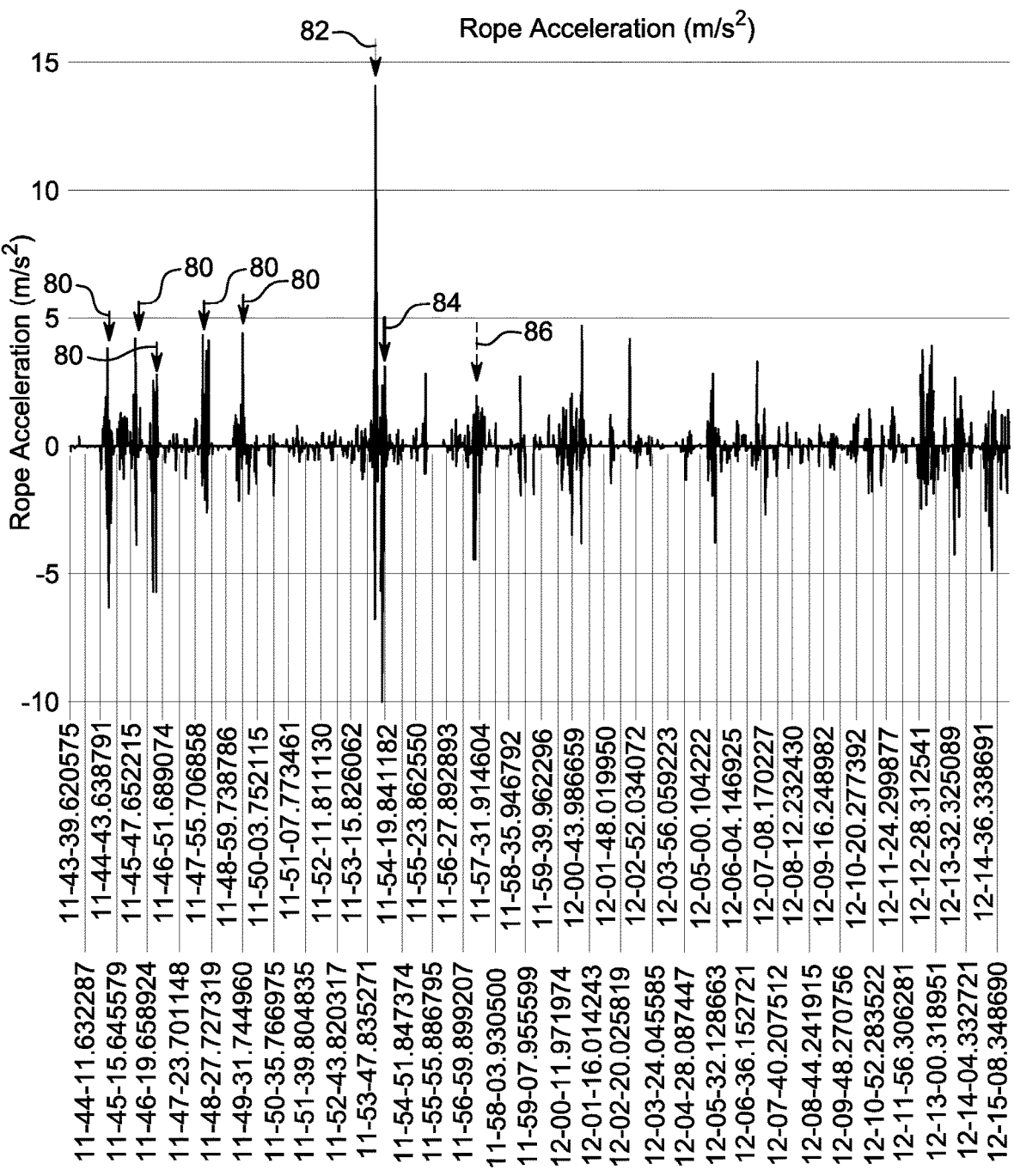
FIG. 11 is a graph showing an acceleration of the rope recorded by the fall control unit during recovery of the animal.

The encoder sensor detects and records various parameters of the rope 18, 30 and/or the drum 38, such as the force of the rope 18, 30 and/or the drum 38 as shown in FIG. 8, the position of the rope 18, 30 and/or the drum 38 as shown in FIG. 9, the speed of the rope 18, 30 and/or the drum 38 as shown in FIG. 10, and the acceleration of the rope 18, 30 and/or the drum 38 as shown in FIG. 11. Spikes 80 of acceleration as shown in FIG. 11 indicate attempts of the animal 12 to gain sternal recumbency, meaning the animal 12 is attempting to rise to a standing position while lying on the stomach or chest area. The animal 12 may be attempting to rise to the standing position after waking up from anesthesia. Spike 82 of acceleration indicates the time when the animal 12 first stands. Spike 84 of acceleration indicates a fall of the animal 12 soon after standing up. Spike 86 of acceleration indicates that the animal 12 crashed against the wall 22 of the recovery space 20.

Figure 14:
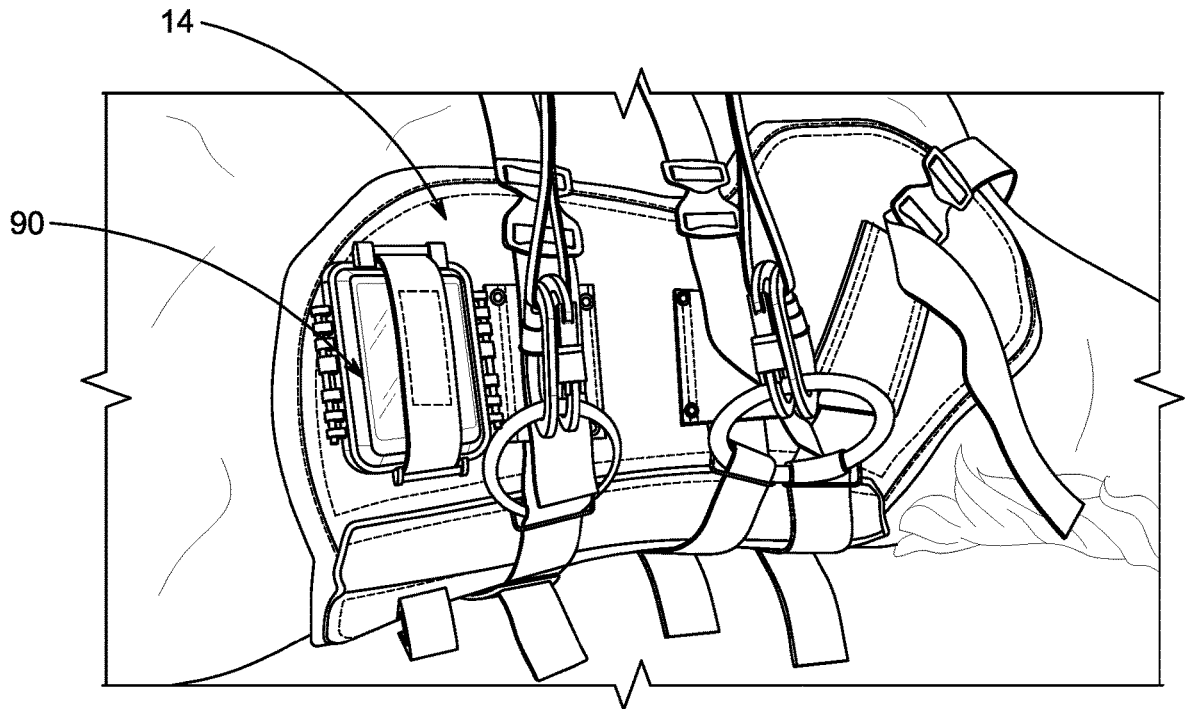
FIG. 14 is a perspective view of an inertia measuring unit fitted to the harness for measurements of acceleration.

The harness 14 can be fitted with an inertia measuring unit 90 as shown in FIG. 14. In this embodiment, the sensor 42 includes the inertia measuring unit 90. The inertia measuring unit 90 records three axes of acceleration to detect vertical acceleration and horizontal/lateral acceleration of the harness 14, and thus, the animal 12. The vertical acceleration is indicative of an uncontrolled fall of the animal 12, while the horizontal/lateral acceleration is indicative of a crash into the wall 22. Data from the inertia measuring unit 90 may be recorded electronically at a frequency of 100 Hz for further processing, such as by the controller 44.

Figure 15:
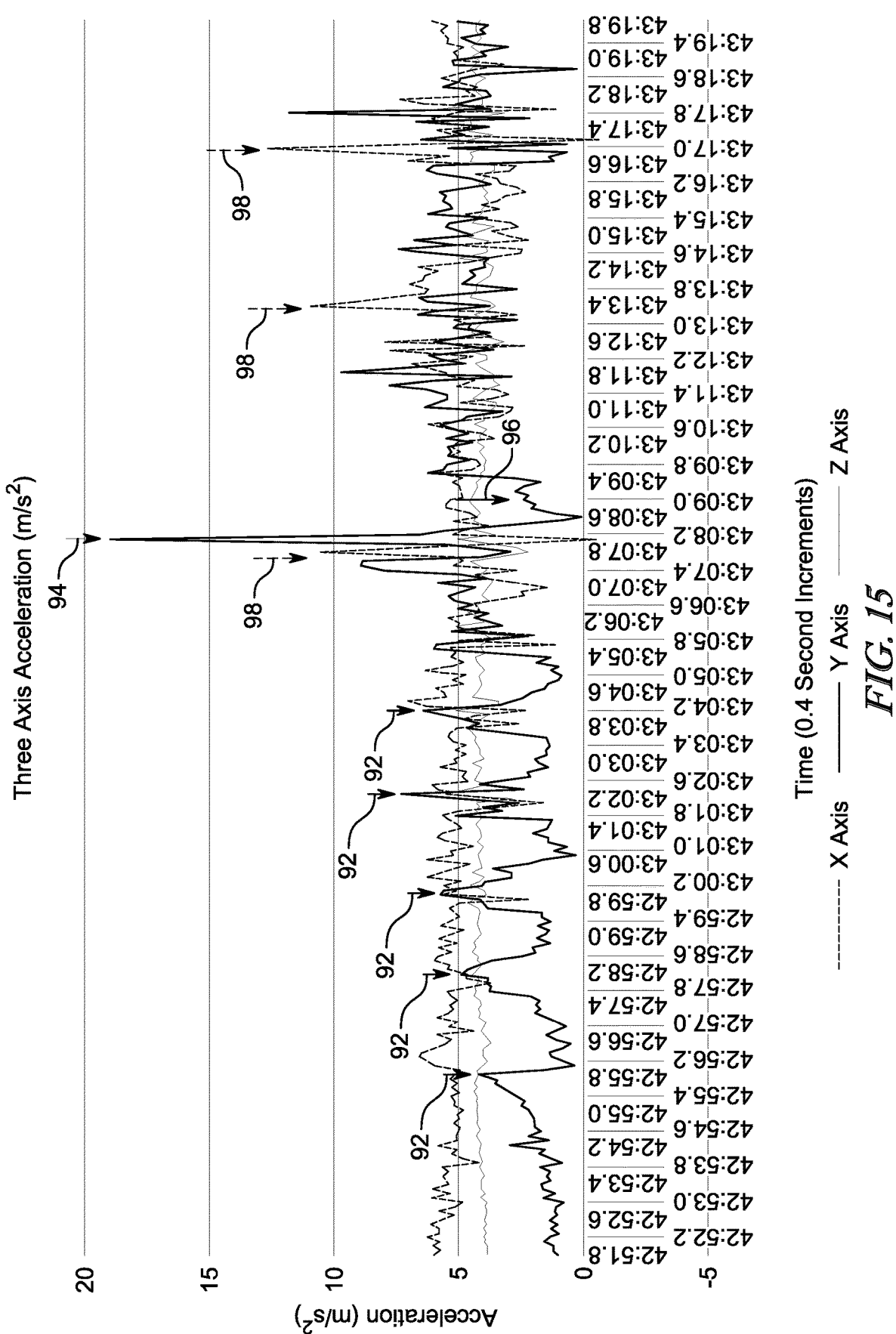
FIG. 15 is a graph showing three axes of acceleration recorded during recovery of the animal.

The recorded three axes of acceleration by the inertia measuring unit 90 is shown in FIG. 15. Data recorded by the inertia measuring unit 90 differentiates between the three different axes (x, y, z). Spikes 92 of acceleration in the vertical direction (y-axis) indicate attempts of the animal 12 to gain sternal recumbency, meaning the animal 12 is attempting to rise while lying on the stomach or chest area. Spike 94 of acceleration in the vertical direction indicates the time when the animal 12 first reaches the standing position. Spike 96 of acceleration in the vertical direction indicates a fall of the animal 12 soon after standing up. The small bumps shown in spike 96 reflect the system 10 detecting the fall, the brake force being applied to the rope 18, 30 and the harness 14, and the system 10 holding the animal 12 upright for a short period of time. Spikes 98 of acceleration in the horizontal direction (x-axis) indicates that the animal 12 crashed against the wall 22 of the recovery space 20. The first spike of spikes 98 occurs at the same time as spike 86 of FIG. 11. However, when using the inertia measuring unit 90, the system 10 can detect that the spike in acceleration is in the horizontal direction, and therefore, is a horizontal/lateral movement and not a vertical fall.

Figure 12:
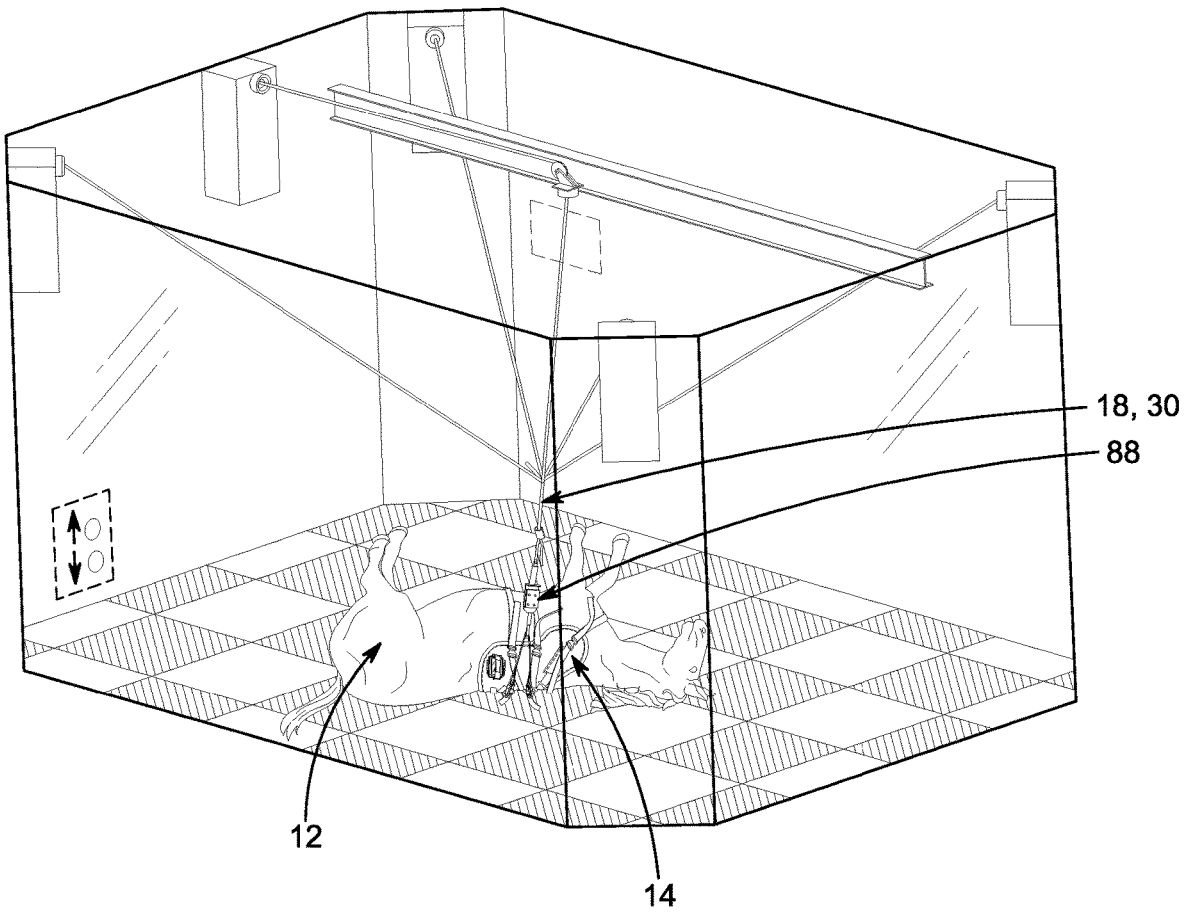
FIG. 12 is a perspective view of the land-based ungulate recovery support system including a release mechanism connected to the harness and the rope.
Figure 13:
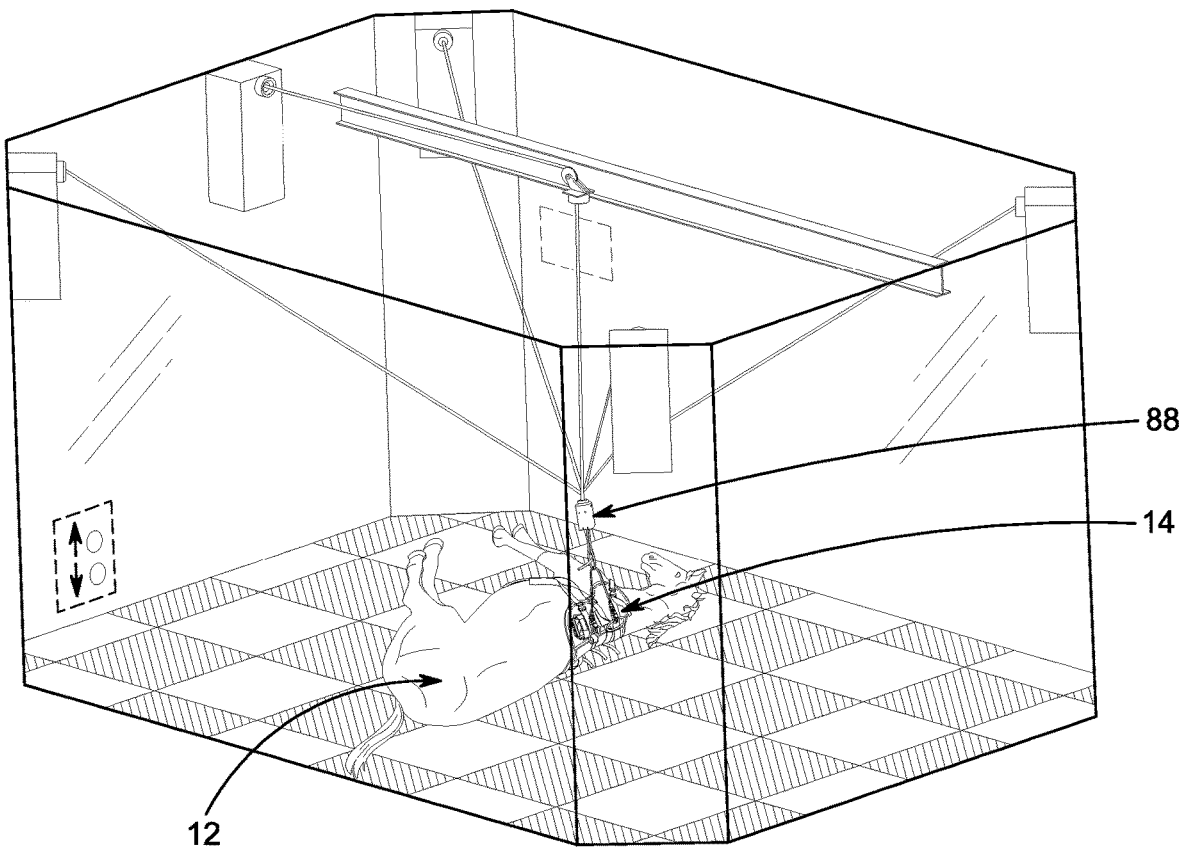
FIG. 13 is a perspective view of the release mechanism of FIG. 12.

The ungulate recovery support system 10 can further include a release mechanism 88 as shown in FIGS. 12 and 13. The animal 12 is coupled to the fall control unit 16 via the release mechanism 88. The release mechanism 88 connects the rope 18, 30 to the harness 14. The release mechanism 88 is configured to disengage the rope 18, 30 from the harness 14 if the system 10 malfunctions. In some embodiments, the release mechanism 88 may be remotely and manually activated. In alterative embodiments, the release mechanism 88 may be activated by the controller 44 based on a signal from the sensor 42.

The ungulate recovery support system 10 can further include at least one secondary fall control unit 28 and at least one secondary rope 30 as shown in FIG. 1. The at least one secondary fall control unit 28 is mounted in the recovery space 20 and coupled to the harness 14 via the at least one secondary rope 30.

The at least one secondary fall control unit 28 may be mounted in the upper corner 31 of the recovery space 20 as shown in FIG. 1. The at least one secondary fall control unit 28 is configured to provide a brake force to the harness 14 through the secondary rope 30 to resist motion of the harness 14 away from the secondary fall control unit 28. While the fall control unit 16 applies the brake force to prevent a fall of the animal 12 (i.e., vertical and downward motion), the secondary fall control unit 28 applies the brake force to prevent uncontrolled stagger of the animal 12 (i.e., horizontal motion). The at least one secondary fall control unit 28 maintains a horizontal velocity or acceleration of the harness 14 within a preset limit when the harness 14 is fitted to the animal 12 during recovery so an uncontrolled stagger and potential injury to the animal 12 is avoided.

The at least one secondary fall control unit 28 is similar to the fall control unit 16, except that a sensor of the secondary fall control unit 28 detects when an uncontrolled stagger is occurring based on a parameter, which corresponds to a horizontal velocity or acceleration of the harness 14. There may be any number of secondary fall control units 28 included in the ungulate recovery support system 10.

If the parameter is greater than or equal to the preset limit, the sensor sends the parameter to the controller 44 of the secondary fall control unit 28 indicating a staggering event is occurring. Then, the same response process as described in relation to the fall control unit 16 occurs to apply the brake force to the harness 14 via the rope 18 and prevent the staggering event.

The at least one secondary rope 30 extends from the at least one secondary fall control unit 28 to the harness 14 as shown in FIG. 1. The secondary rope 30 does not extend over the ceiling mounted pulley 24 like the rope 18. Instead, the secondary rope 30 extends directly between the secondary fall control unit 28 and the harness 14, which allows the secondary fall control unit 28 to control horizontal movement of the animal 12, as opposed to vertical movement. There may be any number of secondary ropes 30 included in the ungulate recovery support system 10 corresponding to the number of secondary fall control units 28.

The following numbered clauses include embodiments that are contemplated and non-limiting:

Clause 1. A land-based ungulate recovery support and stabilization system, the system including a harness configured to be fitted on an animal, and a fall control unit mounted in the recovery space and coupled to the harness via a rope, the fall control unit configured to provide means for applying a brake force to the harness through the rope to keep a downward fall velocity or acceleration of the harness within a preset limit during a recovery so that an uncontrolled fall and potential injury to the animal is avoided.

Clause 2. The system of clause 1, any other suitable clause, or combination of clauses, wherein the fall control unit includes a rope management assembly with a drum mounted for rotation about a drum axis about which the rope is wound, a motor coupled to the drum to drive rotation of the drum to wind the rope around the drum, and a brake system configured to selectively arrest rotation of the drum.

Clause 3. The system of clause 2, any other suitable clause, or combination of clauses, wherein the fall control unit includes a sensor configured to provide a parameter associated with the fall velocity or acceleration of the harness and a controller coupled to the sensor and the brake system, the controller being configured to direct the brake system to arrest rotation of the drum in response to receipt of the parameter associated with the downward fall velocity or acceleration of the harness that exceeds the preset limit.

Clause 4. The system of clause 3, any other suitable clause, or combination of clauses, wherein the sensor includes a position sensor configured to detect a position of the drum that can be extrapolated to determine the parameter associated with the fall velocity or acceleration of the harness.

Clause 5. The system of clause 3, any other suitable clause, or combination of clauses, wherein the brake system includes a brake disk coupled to the drum of the rope management assembly for rotation with the drum and a brake caliper configured to engage the brake disk to selectively arrest rotation of the drum.

Clause 6. The system of clause 3, any other suitable clause, or combination of clauses, wherein the brake system includes a brake control having a secondary motor, a hydraulic brake master cylinder, and a linkage for converting rotation of the secondary motor into linear activation of the hydraulic brake master cylinder.

Clause 7. The system of clause 2, any other suitable clause, or combination of clauses, wherein the rope management assembly includes a rope winder configured to direct the rope during winding into a single layer along the drum in order to minimize give in the rope that might be developed from multiple layers of rope sliding relative to one another during the uncontrolled fall.

Clause 8. The system of clause 7, any other suitable clause, or combination of clauses, wherein the rope winder includes a threaded rod mounted for rotation about a rod axis parallel to and spaced apart from the drum axis, a line guide through which the rope is directed prior to contact with the drum during winding, and a drive nut fixed to the line guide and engaged with threads of the threaded rod so as to be moved with the line guide along the rod axis during rotation of the threaded rod.

Clause 9. The system of clause 8, any other suitable clause, or combination of clauses, wherein the motor is coupled to the threaded rod to drive rotation of the threaded rod about the rod axis.

Clause 10. The system of clause 2, any other suitable clause, or combination of clauses, wherein the rope management assembly includes the drum, an omnidirectional rope guide sleeve through which the rope passes as it exits the fall control unit, the drum about which the rope is wound within the fall control unit, and a pulley over which the rope extends as it moves from the omnidirectional rope guide sleeve to the drum.

Clause 11. The system of clause 10, any other suitable clause, or combination of clauses, wherein the pulley is mounted to rotate about a pulley axis and the pulley axis can tilt so as to provide a tilting pulley.

Clause 12. The system of clause 10, any other suitable clause, or combination of clauses, wherein the fall control unit includes a sensor configured to inform a parameter associated with the fall velocity or acceleration of the harness.

Clause 13. The system of clause 12, any other suitable clause, or combination of clauses, wherein the sensor includes a position sensor that detects a position of the drum.

Clause 14. The system of clause 1, any other suitable clause, or combination of clauses, wherein rope interconnecting the harness and the fall control unit extends over a pulley.

Clause 15. The system of clause 14, any other suitable clause, or combination of clauses, wherein the pulley is mounted in an overhead location, preferably to a ceiling of the recovery space.

Clause 16. The system of clause 15, any other suitable clause, or combination of clauses, wherein the fall control unit is fixed to a wall of the recovery space.

Clause 17. The system of clause 14, any other suitable clause, or combination of clauses, further comprising at least one secondary fall control unit mounted in the recovery space and coupled to the harness via a secondary rope.

Clause 18. The system of clause 17, any other suitable clause, or combination of clauses, wherein the at least one secondary fall control unit is configured to provide means for applying a brake force to the harness through the secondary rope to resist motion of the harness away from the secondary fall control unit.

Clause 19. The system of clause 18, any other suitable clause, or combination of clauses, wherein each of the at least one secondary fall control units is arranged in a corner of the recovery space.

Clause 20. The system of clause 19, any other suitable clause, or combination of clauses, wherein the at least one secondary fall control unit is configured to provide means for applying the brake force to the harness through the secondary rope to keep a horizontal velocity or acceleration of the harness within a preset limit when the harness is fitted to the animal during recovery so an uncontrolled stagger and potential injury to the animal is avoided.

Clause 21. The system of clause 1, any other suitable clause, or combination of clauses, further comprising a lifter sized to selectively lift the animal.

Clause 22. The system of clause 1, any other suitable clause, or combination of clauses, wherein the fall control unit is sized to arrest a fall of the animal without lifting the animal.

Clause 23. A fall control unit for use in a land-based ungulate recovery space, the unit comprising a rope management assembly with a drum mounted for rotation about a drum axis about which a rope is wound, a motor coupled to the drum to drive rotation of the drum to wind the rope around the drum, a brake system configured to selectively arrest rotation of the drum, and a controller coupled to the brake system and configured to direct the brake system to arrest rotation of the drum in response to receipt of a parameter associated with a velocity or acceleration of a land-based ungulate coupled to the rope that exceeds a preset limit.

Clause 24. The unit of clause 23, any other suitable clause, or combination of clauses, wherein the fall control unit includes a sensor configured to inform the parameter associated with the velocity or acceleration and to communicate the parameter to the controller.

Clause 25. The unit of clause 24, any other suitable clause, or combination of clauses, wherein the sensor includes a position sensor configured to detect a position of the drum.

Clause 26. The unit of clause 23, any other suitable clause, or combination of clauses, wherein the brake system includes a brake disk coupled to the drum of the rope management assembly for rotation with the drum and a brake caliper configured to engage the brake disk to selectively arrest rotation of the drum.

Clause 27. The unit of clause 26, any other suitable clause, or combination of clauses, wherein the brake system includes a brake control having a secondary motor, a hydraulic brake master cylinder, and a linkage for converting rotation of the secondary motor into linear activation of the hydraulic brake master cylinder.

Clause 28. The unit of clause 23, any other suitable clause, or combination of clauses, wherein the rope management assembly includes a rope winder configured to direct the rope during winding into a single layer along the drum.

Clause 29. The unit of clause 28, any other suitable clause, or combination of clauses, wherein the rope winder includes a threaded rod mounted for rotation about a rod axis parallel to and spaced apart from the drum axis, a line guide through which the rope is directed prior to contact with the drum during winding, and a drive nut fixed to the line guide and engaged with threads of the threaded rod so as to be moved with the line guide along the rod axis during rotation of the threaded rod.

Clause 30. The unit of clause 29, any other suitable clause, or combination of clauses, wherein the motor is coupled to the threaded rod to drive rotation of the threaded rod about the rod axis.

Clause 31. The unit of clause 23, any other suitable clause, or combination of clauses, wherein the rope management assembly includes the drum, an omnidirectional rope guide sleeve through which the rope passes as it exits the fall control unit, the drum about which the rope is wound within the fall control unit, and a pulley over which the rope extends as it moves from the omnidirectional rope guide sleeve to the drum.

Clause 32. The unit of clause 31, any other suitable clause, or combination of clauses, wherein the pulley is mounted to rotate about a pulley axis and the pulley axis can tilt so as to provide a tilting pulley.

Clause 33. The unit of clause 31, any other suitable clause, or combination of clauses, wherein the fall control unit includes a sensor configured to inform a parameter associated with the velocity or acceleration of the harness.

Clause 34. The unit of clause 33, any other suitable clause, or combination of clauses, wherein the sensor includes position sensor configured to detect a position of the drum.

Clause 35. The unit of clause 23, any other suitable clause, or combination of clauses, further comprising a lifter sized to selectively lift the land-based ungulate.

Clause 36. The unit of clause 23, any other suitable clause, or combination of clauses, wherein the fall control unit is sized to arrest a fall of the land-based ungulate without lifting the land-based ungulate.

Clause 37. A method of supporting a land-based ungulate during recovery, the method comprising providing the land-based ungulate recovery support and stabilization system of any one of clauses 1-22, fitting the harness onto the land-based ungulate, and performing at least one recovery step while the harness is fitted onto the land-based ungulate so as to keep the fall velocity or acceleration of the land-based ungulate within the preset limit during the at least one recovery step.

Clause 38. The method of clause 37, any other suitable clause, or combination of clauses, wherein the at least one recovery step includes recovering from anesthesia.

The invention claimed is:

1. A land-based ungulate recovery support and stabilization system, the system comprising:

a harness configured to be fitted on an animal, and a fall control unit mounted in the recovery space and coupled to the harness via a rope, the fall control unit configured to provide means for applying a brake force to the harness through the rope to keep a downward fall velocity or acceleration of the harness within a preset limit during a recovery so that an uncontrolled fall and potential injury to the animal is avoided wherein the fall control unit includes a rope management assembly with a drum mounted for rotation about a drum axis about which the rope is wound, a motor coupled to the drum to drive rotation of the drum to wind the rope around the drum, and a brake system configured to selectively arrest rotation of the drum, and wherein the rope management assembly includes a rope winder configured to direct the rope during winding into a single layer along the drum in order to minimize give in the rope that might be developed from multiple layers of rope sliding relative to one another during the uncontrolled fall, and wherein the rope winder includes a threaded rod mounted for rotation about a rod axis parallel to and spaced apart from the drum axis, a line guide through which the rope is directed prior to contact with the drum during winding, and a drive nut fixed to the line guide and engaged with threads of the threaded rod so as to be moved with the line guide along the rod axis during rotation of the threaded rod.

2. The system of claim 1, wherein the fall control unit includes a sensor configured to provide a parameter associated with the fall velocity or acceleration of the harness and a controller coupled to the sensor and the brake system, the controller being configured to direct the brake system to arrest rotation of the drum in response to receipt of the parameter associated with the downward fall velocity or acceleration of the harness that exceeds the preset limit.

3. The system of claim 2, wherein the sensor includes a position sensor configured to detect a position of the drum that can be extrapolated to determine the parameter associated with the fall velocity or acceleration of the harness.

4. The system of claim 1, wherein the motor is coupled to the threaded rod to drive rotation of the threaded rod about the rod axis.

5. The system of claim 1, wherein the rope management assembly includes the drum about which the rope wound, an omnidirectional rope guide sleeve through which the rope passes as it exits the fall control unit, the drum about which the rope is wound within the fall control unit, and a pulley over which the rope extends as it moves from the omnidirectional rope guide sleeve to the drum.

6. The system of claim 5, wherein the fall control unit includes a sensor configured to inform a parameter associated with the fall velocity or acceleration of the harness.

7. The system of claim 6, wherein the sensor includes a position sensor that detects a position of the drum.

8. The system of claim 1, wherein rope interconnecting the harness and the fall control unit extends over a pulley.

9. The system of claim 8, wherein the pulley is mounted in an overhead location.

10. The system of claim 8, further comprising at least one secondary fall control unit mounted in the recovery space and coupled to the harness via a secondary rope.

11. The system of claim 10, wherein the at least one secondary fall control unit is configured to provide means for applying a brake force to the harness through the secondary rope to resist motion of the harness away from the secondary fall control unit.

12. The system of claim 1, further comprising a lifter sized to selectively lift the animal.

13. The system of claim 1, wherein the fall control unit is sized to arrest a fall of the animal without lifting the animal.

14. A fall control unit for use in a land-based ungulate recovery space, the unit comprising:

a rope management assembly with a drum mounted for rotation about a drum axis about which a rope is wound, a motor coupled to the drum to drive rotation of the drum to wind the rope around the drum, a brake system configured to selectively arrest rotation of the drum, and a controller coupled to the brake system and configured to direct the brake system to arrest rotation of the drum in response to receipt of a parameter associated with a velocity or acceleration of a land-based ungulate coupled to the rope that exceeds a preset limit wherein the rope management assembly includes a rope winder configured to direct the rope during winding into a single layer along the drum in order to minimize give in the rope that might be developed from multiple layers of rope sliding relative to one another during an uncontrolled fall, and wherein the rope winder includes a threaded rod mounted for rotation about a rod axis parallel to and spaced apart from the drum axis, a line guide through which the rope is directed prior to contact with the drum during winding, and a drive nut fixed to the line guide and engaged with threads of the threaded rod so as to be moved with the line guide along the rod axis during rotation of the threaded rod.

15. The unit of claim 14, wherein the fall control unit includes a sensor configured to inform the parameter associated with the velocity or acceleration and to communicate the parameter to the controller.

16. The unit of claim 15, wherein the sensor includes a position sensor configured to detect a position of the drum.

17. The system of claim 11, wherein each of the at least one secondary fall control units is arranged in a corner of the recovery space, and wherein the at least one secondary fall control unit is configured to provide means for applying the brake force to the harness through the secondary rope to keep a horizontal velocity or acceleration of the harness within a preset limit when the harness is fitted to the animal during recovery so an uncontrolled stagger and potential injury to the animal is avoided.

\* \* \* \* \*